(12) United States Patent
Dinsdale et al.

(10) Patent No.: US 11,708,044 B2
(45) Date of Patent: *Jul. 25, 2023

(54) ROOF AIRBAG FOR A VEHICLE

(71) Applicant: AUTOLIV ASP, INC., Ogden, UT (US)

(72) Inventors: Charles Paul Dinsdale, Ogden, UT (US); Tyler Glen Christiansen, Ogden, UT (US); Cesar Armando Tinajero, Ogden, UT (US); Adam Smith, Plain City, UT (US)

(73) Assignee: Autoliv ASP, Inc., Ogden, UT (US)

( * ) Notice: Subject to any disclaimer, the term of this patent is extended or adjusted under 35 U.S.C. 154(b) by 31 days.

This patent is subject to a terminal disclaimer.

(21) Appl. No.: 17/233,686

(22) Filed: Apr. 19, 2021

(65) Prior Publication Data

US 2022/0332274 A1 Oct. 20, 2022

(51) Int. Cl.
*B60R 21/214* (2011.01)
*B60R 21/231* (2011.01)
(Continued)

(52) U.S. Cl.
CPC .......... *B60R 21/231* (2013.01); *B60R 21/214* (2013.01); *B60R 21/233* (2013.01);
(Continued)

(58) Field of Classification Search
CPC . B60R 21/214; B60R 21/231; B60R 21/2346; B60R 21/2344; B60R 21/233;
(Continued)

(56) References Cited

U.S. PATENT DOCUMENTS

| 3,721,468 A | 3/1973 | Burgess |
| 6,135,497 A | 10/2000 | Sutherland et al. |

(Continued)

FOREIGN PATENT DOCUMENTS

| CN | 205989721 U | * 3/2017 | ............ B60R 21/20 |
| CN | 112721849 A | 4/2021 | |

(Continued)

OTHER PUBLICATIONS

U.S. Appl. No. 17/308,313, filed May 5, 2021, Charles Paul Dinsdale.

(Continued)

*Primary Examiner* — Keith J Frisby
(74) *Attorney, Agent, or Firm* — Harness, Dickey & Pierce, P.L.C.

(57) ABSTRACT

A roof airbag for a vehicle longitudinally extends along a length between first and second longitudinal ends and laterally extends along a width between first and second lateral sides. An inlet for receiving inflation gases is provided at the first longitudinal end. A plenum is in fluid communication with the inlet for receiving the inflation gases from the inlet. The roof airbag includes a plurality of primary inflatable chambers, each primary inflatable chamber in fluid communication with the plenum to receive inflation gases from the plenum. A plurality of secondary inflatable chambers is in indirect fluid communication with the plenum to receive inflation gases indirectly from the plenum through the plurality of primary inflatable chambers. The primary inflatable chambers of the plurality of primary inflatable chambers are arranged to first drive deployment of the airbag and subsequently inflate the second inflatable chambers of the plurality of second inflatable chambers to tension the airbag in the lateral direction. The primary and secondary inflatable (Continued)

chambers cooperate to provide a barrier between occupants of the vehicle and the roof frame.

19 Claims, 8 Drawing Sheets

(51) Int. Cl.
  *B60R 21/2346* (2011.01)
  *B60R 21/233* (2006.01)
(52) U.S. Cl.
  CPC ............... *B60R 21/2346* (2013.01); *B60R 2021/23192* (2013.01); *B60R 2021/23308* (2013.01); *B60R 2021/23316* (2013.01)
(58) Field of Classification Search
  CPC ........ B60R 21/213; B60R 2021/23192; B60R 2021/23308; B60R 2021/23316; B60R 2021/23324
  USPC ............................................ 280/743.1, 730.1
  See application file for complete search history.

(56) References Cited

U.S. PATENT DOCUMENTS

| | | | |
|---|---|---|---|
| 6,189,960 | B1 | 2/2001 | Mumura et al. |
| 7,946,615 | B2 | 5/2011 | Takahashi et al. |
| 9,156,334 | B1 | 10/2015 | Robins et al. |
| 9,771,048 | B2 | 9/2017 | Min et al. |
| 9,994,182 | B1 | 6/2018 | Jaradi et al. |
| 10,391,967 | B2 | 8/2019 | Lee et al. |
| 10,449,923 | B2 | 10/2019 | Son et al. |
| 10,471,924 | B2 | 11/2019 | Min et al. |
| 10,604,104 | B2 | 3/2020 | Raikar et al. |
| 10,744,971 | B2 | 8/2020 | Hwangbo et al. |
| 11,021,128 | B2 | 6/2021 | Raikar et al. |
| 11,332,094 | B2 | 5/2022 | Farooq et al. |
| 11,390,231 | B2 * | 7/2022 | Lee ..................... B60R 21/08 |
| 2014/0346758 | A1 | 11/2014 | Mueller et al. |
| 2017/0267199 | A1 | 9/2017 | Schütt et al. |
| 2018/0162313 | A1 | 6/2018 | Lee et al. |
| 2018/0162314 | A1 * | 6/2018 | Lee ..................... B60R 21/2338 |
| 2018/0162315 | A1 | 6/2018 | Lee et al. |
| 2018/0265029 | A1 * | 9/2018 | Min ..................... B60R 21/23 |
| 2019/0143928 | A1 | 5/2019 | Raikar et al. |
| 2019/0210555 | A1 | 7/2019 | Koo |
| 2021/0101556 | A1 | 4/2021 | Jaradi et al. |
| 2021/0138996 | A1 * | 5/2021 | Min ..................... B60R 21/2646 |
| 2021/0155197 | A1 * | 5/2021 | Jeong ................. B60R 21/2334 |
| 2021/0179004 | A1 * | 6/2021 | Lee ..................... B60R 21/214 |
| 2021/0245692 | A1 * | 8/2021 | Lee ..................... B60R 21/013 |
| 2022/0063543 | A1 * | 3/2022 | Lee ..................... B60R 21/231 |
| 2022/0153222 | A1 * | 5/2022 | Min ..................... B60R 21/214 |
| 2022/0153223 | A1 * | 5/2022 | Min ..................... B60R 21/231 |
| 2022/0332274 | A1 | 10/2022 | Dinsdale et al. |

FOREIGN PATENT DOCUMENTS

| | | | | |
|---|---|---|---|---|
| DE | 19853479 | A1 | 8/1999 | |
| DE | 10117543 | A1 | 10/2002 | |
| DE | 102004045968 | A1 | 6/2005 | |
| DE | 102017128085 | A1 * | 1/2019 | ............ B60R 21/20 |
| JP | 2006306377 | A | 11/2006 | |
| JP | 2012136155 | A | 7/2012 | |
| KR | 20170031406 | A | 3/2017 | |
| WO | 2016174785 | A1 | 11/2016 | |
| WO | 2018114723 | A1 | 6/2018 | |

OTHER PUBLICATIONS

U.S. Appl. No. 17/391,329, filed Aug. 2, 2021, Tyler Glen Christiansen.
International Search Report and Written Opinion regarding International Patent Application No. PCT/US2022/023949, dated Jun. 20, 2022.
International Search Report and Written Opinion regarding International Patent Application No. PCT/US2022/023075, dated Jun. 17, 2022.
International Search Report and Written Opinion regarding International Patent Application No. PCT/US2022/035644, dated Nov. 14, 2022.
Machine translation of Office Action received in corresponding Chinese application No. 202080067254.9 dated Mar. 28, 2023.

* cited by examiner

ROOF AIRBAG FOR A VEHICLE

FIELD

The present disclosure generally concerns inflatable occupant restraint systems for vehicles. More particularly, the present disclosure relates to a roof airbag for a vehicle.

BACKGROUND

This section provides background information related to the present disclosure which is not necessarily prior art.

Inflatable occupant restraints or airbags are commonly included on motor vehicles for passive occupant protection. Airbags used for frontal impact protection are generally installed in the vehicle steering wheel for the driver and behind the vehicle instrument panel for other front seat occupants. In addition to frontal impact protection, inflatable restraints are used for occupant protection from side impacts. For example, side curtain airbags are typically mounted along the roof rail of a vehicle and deploy in a downward direction to provide an energy absorbing structure between the head and upper torso of an occupant and the vehicle interior components.

In the event of an accident or impending accident, a sensor within the vehicle measures abnormal deceleration, for example, the airbag is triggered to inflate within a few milliseconds with gas produced by a device commonly referred to as an "inflator". The inflated airbag cushions the vehicle occupant from impact forces.

To a more limited extent, it has been generally proposed to provide an airbag system for a vehicle having a roof airbag. Such a roof airbag is intended to even further protect occupants of the vehicle by providing an inflatable barrier between the occupants and the roof of the vehicle.

While known occupant restraint systems, including systems having a roof airbag, have generally proven to be suitable for their intended uses, a continuous need for improvement in the relevant art remains.

SUMMARY

This section provides a general summary of the disclosure, and is not a comprehensive disclosure of its full scope or all of its features.

It is a general object of the present teachings to provide a roof airbag that quickly and reliably deploys along a horizontal trajectory.

In accordance with one particular aspect, the present teachings provide a roof airbag for a vehicle. The roof airbag longitudinally extends along a length between first and second longitudinal ends and laterally extends along a width between first and second lateral sides. An inlet for receiving inflation gases is provided at the first longitudinal end. A plenum is in fluid communication with the inlet for receiving the inflation gases from the inlet. The roof airbag includes a plurality of primary inflatable chambers, each primary inflatable chamber in fluid communication with the plenum to receive inflation gases from the plenum. A plurality of secondary inflatable chambers is in indirect fluid communication with the plenum to receive inflation gases indirectly from the plenum through the plurality of primary inflatable chambers. The primary inflatable chambers of the plurality of primary inflatable chambers are arranged to first drive deployment of the airbag and subsequently inflate the second inflatable chambers of the plurality of second inflatable chambers to tension the airbag in the lateral direction. The primary and secondary inflatable chambers cooperate to provide a barrier between occupants of the vehicle and the roof frame.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments, not all possible implementations, and are not intended to limit the scope of the present disclosure.

DETAILED DESCRIPTION

One or more example embodiments will now be described more fully with reference to the accompanying drawings. The one or more example embodiments are provided so that this disclosure will be thorough and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, and that the example embodiment should not be construed to limit the scope of the present disclosure.

Well-known processes, well-known device structures, and well-known technologies are not described herein in detail.

The phrases "connected to", "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "adjacent" refers to items that are in close physical proximity with each other, although the items may not necessarily be in direct contact. The phrase "fluid communication" refers to two features that are connected such that a fluid within one feature is able to pass into the other feature. "Exemplary" as used herein means serving as a typical or representative example or instance and does not necessarily mean special or preferred.

Figure 1:
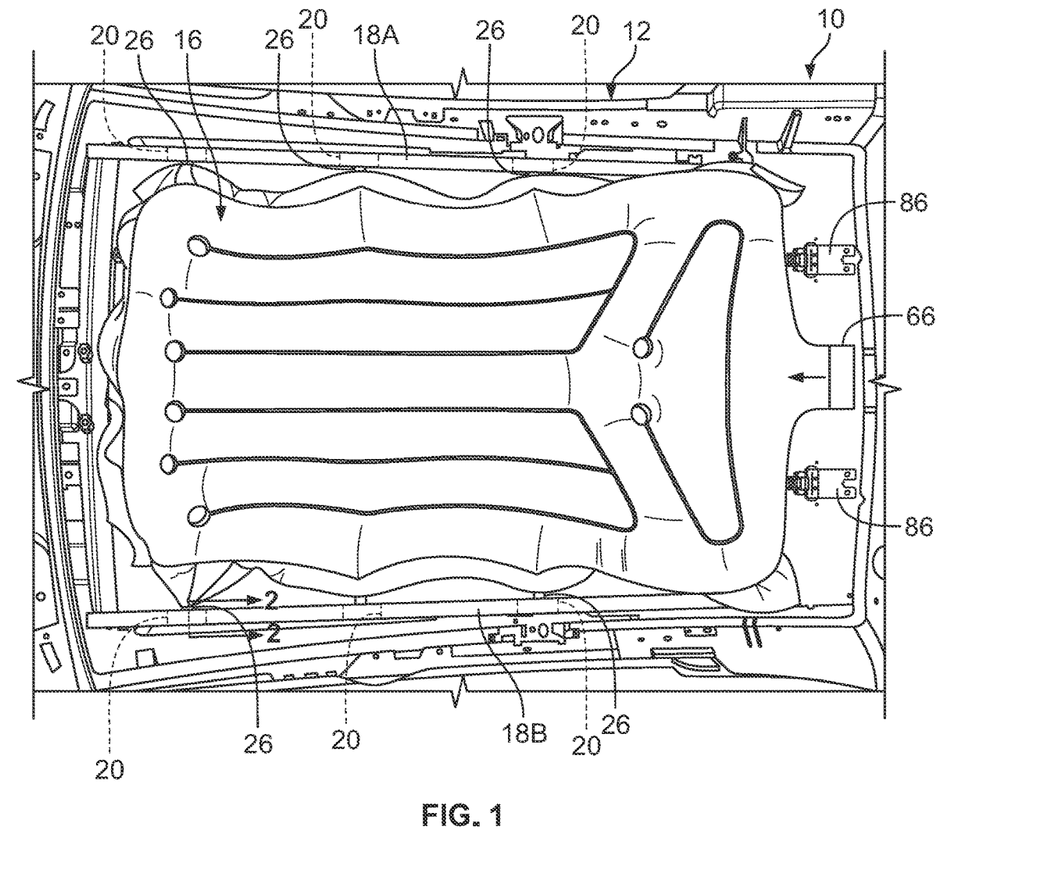
FIG. 1 is a bottom view of the roof airbag arrangement for a vehicle in accordance with the present teachings, the roof airbag arrangement shown operatively associated with a roof frame of a vehicle, an airbag of the roof airbag arrangement shown after deployment.

With general reference to the drawings and particular reference to the environmental view of FIG. 1, a roof airbag arrangement for a vehicle in accordance with the present teachings is illustrated and generally identified at reference character 10. The roof airbag arrangement 10 is shown operatively incorporated into a roof frame 12 defining an opening 14 (shown in FIGS. 12 and 13) and the opening 14 further shown covered with an airbag 16 of the roof airbag arrangement fully deployed. In the embodiment illustrated, the opening is a panoramic opening 14. In other applications (not shown), the opening may be for a sunroof. It will also be understood that the present teachings may be used with vehicle roofs without an opening.

The airbag 16 shown in FIG. 1 will be understood to be considered exemplary in construction and operation insofar as the first and second guide rails 18A and 18B and the interconnection of the first and second guide rails 18A and 18B with the airbag 16 are concerned. In this regard, the roof airbag arrangement 10 may use various other airbags, including but not limited to the various airbag embodiments 16A-16F described below. It will be further understood, however, that the airbag 16 of the present teachings and the particular embodiments described herein include various novel aspects that may be used with the roof airbag arrangement 10 or with other roof airbag arrangements.

Figures 2, 3, 4, 5:
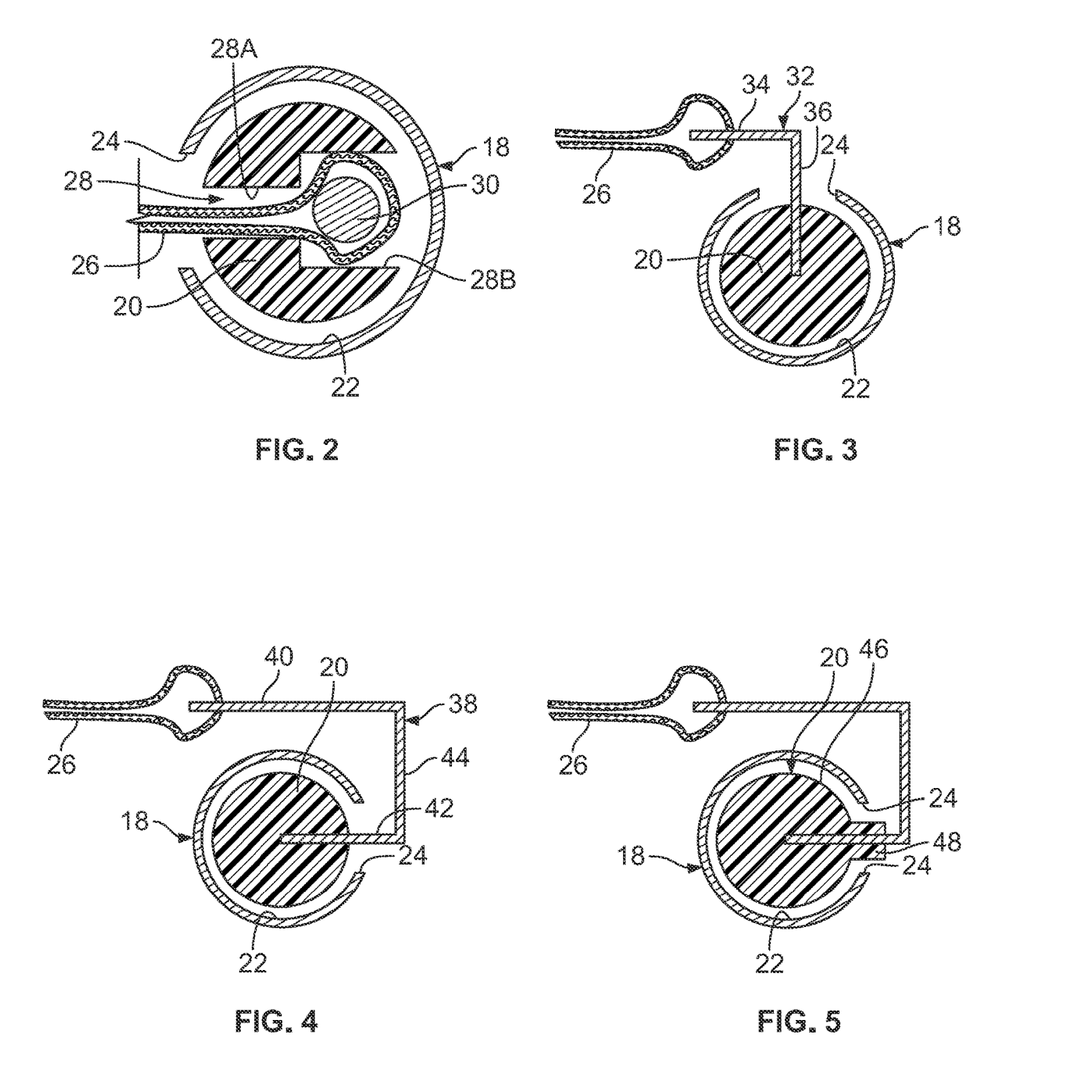
FIG. 2 is cross-sectional of the roof airbag arrangement of FIG. 1, illustrating one of the guide rails of the roof airbag arrangement, a sliding member mounted within the guide rail, and an interconnection between the sliding member and a tether mounted to the airbag.
FIG. 3 is a cross-sectional view similar to FIG. 2 illustrating an alternative arrangement for slidably coupling the airbag to the guide rail.
FIG. 4 is another cross-sectional view similar to FIG. 2 illustrating another alternative arrangement for slidably coupling the airbag to the guide rail.
FIG. 5 is another cross-sectional view similar to FIG. 2 illustrating another alternative arrangement for slidably coupling the airbag to the guide rail.
Figure 12:
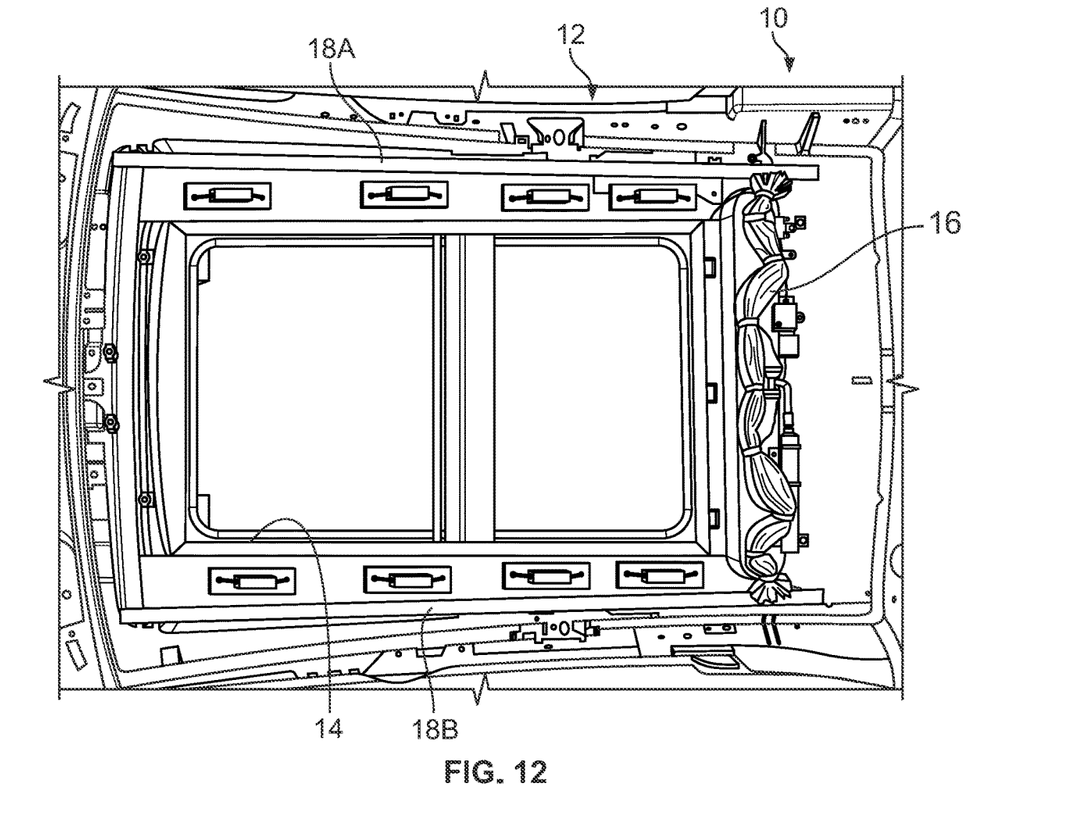
FIG. 12 is a view similar to FIG. 6 illustrating the airbag in a stowed position.

With continued reference to FIG. 1 and additional reference to the cross-sectional view of FIG. 2, the roof airbag arrangement 10 is generally shown to include the airbag 16, first and second guide rails 18A and 18B, and at least one sliding member 20 associated with each of the first and second guide rails 18A and 18B. The first and second guide rails 18A and 18B guide the airbag from a stowed position (as shown in FIG. 12) to a deployed position (as shown in FIG. 1).

In the embodiment illustrated, the first and second guide rails 18A and 18B are on laterally opposite sides of the airbag 16. As will become further understood below, the airbag 16 is deployed in a longitudinal direction along a horizontal trajectory. In other applications, however, the first and second guide rails 18A and 18B may be on longitudinally opposite sides of the airbag 16 and the airbag may be deployed in a lateral direction.

The first and second guide rails 18A and 18B will be understood to be substantially identical to one another. One of the guide rails is shown in further detail in FIG. 2 and identified generically with reference character 18. The first and second guide rails 18A and 18B are on laterally opposite sides of the airbag 16 and define first and second channels 22, respectively. The channel 22 of the first guide rail 18A slidably receives at least one first sliding member 20. Correspondingly, the channel 22 of the second guide rail 18B slidably receives at least one second sliding member 20.

In the embodiment illustrated, the guide rails 18 are tubular guide members with a circular cross section. Other geometries, however, may be employed within the scope of the present teachings. The guide rails 18 may include a longitudinally extending slot 24 that accommodates tethers 26 connecting the sliding members 20 and the airbag 16. As shown in FIG. 1, for example, a first plurality of tethers 26 connects a first lateral side 50 of the airbag 16 with the at least one first sliding member 20. Similarly, a second plurality of tethers 26 connects a second lateral side 52 of the airbag 16 with the at least one second sliding member 20. The longitudinally extending slot 24 may extend completely along the length of the guide rails 18 or substantially along the length of the guide rails 18. The longitudinally extending slot 24 may extend straight down the guide rails 18. In other embodiments, the slots 24 may be helical slots to further tension the airbag 16 in the lateral direction by shortening a tether length as the airbag 16 deploys.

The guide rails 18 may be constructed of aluminum or any other suitable material. In the embodiment illustrated, the roof frame 12 may be an aluminum metal extrusion, for example, integrally formed to include the first and second guide rails 18A and 18B. As such, the number of discrete parts may be reduced to expedite assembly, reduce error, and reduce associated costs. Alternatively, however, the first and second guide rails 18A and 18B may be welded or otherwise suitably attached to the roof frame 12.

In the embodiment illustrated, a plurality of first sliding members 20 are carried by the channel 22 of the first guide rail 18A and a plurality of second sliding members 20 is carried by the channel 22 of the second guide rail 18B. In this manner, each of the tethers 26 carried by the airbag 16 are connected to a separate sliding member 20 and the sliding members 20 independently translate along the respective guide rail 18A and 18B as the roof airbag 16 horizontally deploys.

The sliding members 20 are carried within the first and second guide rails 18A and 18B for translation in a horizontal direction. The sliding members 20 may be complementary in shape to the channel 22 of the guide rails 18. As such, the sliding members 20 shown in FIG. 2 are cylindrical. The sliding members 20 may be injection molded of a plastic material or alternatively constructed of any other suitable material. By the nature of the materials or through treatment of the materials, an interface between the sliding members 20 and the guide rails 18 is provided that has a low coefficient of friction. This interface effectively allows the airbag 16 to reliably and quickly deploy.

The tethers 26 are attached to the sliding members 20. As shown in FIG. 2, the sliding members 20 may include a radially extending opening 28. The opening 28 may include a first side 28A with a first height and a second side 28B with a second, greater height. The tethers 26 of the respective first and second pluralities of tethers entering the sliding member 20 from the first side 28A. A retention member or retention pin 30 may be disposed in the second side 28B of the opening 28. The retention pin 30 may be formed of metal or any other suitable material and has a diameter greater than the first height of the first side 28A and thereby cannot be pulled through the first side 28A. The tethers 26, which may be formed of a synthetic polymer such as nylon, for example, are wrapped around the retention pin 30 and each include first and second ends sewn or otherwise suitably secured to the airbag 16. In some applications, the tethers 26 may be formed or manufactured integrally with the airbag 16.

Turning to FIG. 3, an alternative arrangement for slidably connecting the airbag 16 with the guide rails 18 is illustrated. As shown, the sliding members 20 may be connected to each of the tethers 26 indirectly through a bracket 32. The brackets 32 may be right angle brackets having a first leg 34 in a plane of the deployed airbag 16 and a second leg 36 perpendicular to the first leg 34. The tether 26 may pass through a hole in the first leg 34 or otherwise be suitably attached to the first leg 34. The sliding member 20 may be molded over the second leg 36 or otherwise suitably connected to the second leg 36.

Turning to FIG. 4, another alternative arrangement for slidably connecting the airbag 16 with the guide rails 18 is illustrated. As shown, the sliding members 20 may again be connected to each of the tethers 26 indirectly through a bracket 38. The brackets 38 may be U-shaped brackets having a first leg 40 in a plane of the deployed airbag 16, a second leg 42 parallel to the first leg 40, and an intermediate portion or leg 44 connecting the first and second legs 40 and 42. As above, the tether 26 may pass through a hole in the first leg 40 or otherwise be suitably attached to the first leg 40. The sliding member 20 may be molded over the second leg 42 or otherwise suitably connected to the second leg 42.

Turning to FIG. 5, another alternative arrangement for slidably connecting the airbag 16 with the guide rails 18 is illustrated. The arrangement of FIG. 5 differs from FIG. 4 in that the sliding member 20 includes a cylindrical portion 46 with a radially extending portion 48. The radially extending portion 48 is sized to pass through the longitudinally extending slot 24 of the guide rail 18. As such, the radially extending portion 48 prevents rotation of the sliding member 20 within the channel 22 of the guide rail 18.

FIGS. 6 through 11 illustrate various particular embodiments of roof airbags in accordance with the present teachings. The features of the various particular roof airbag embodiments will be described with common reference characters to identify similar elements. To the extent not otherwise described, it will be understood that the construction and operation of the various airbags is identical.

Figure 6:
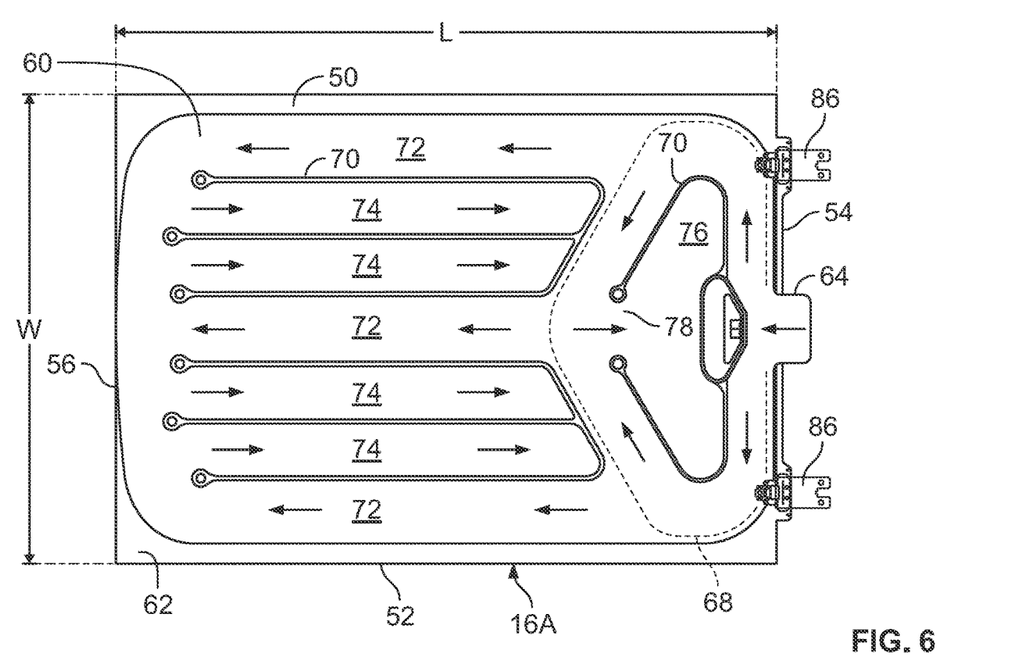
FIG. 6 is a bottom view of an airbag similar to the airbag of FIG. 1, the airbag shown removed from the environment of FIG. 1 for purposes of illustration.

With particular reference to FIG. 6, a particular embodiment of a roof airbag in accordance with the present teachings is illustrated and generally identified at reference character 16A. The airbag 16A is generally rectangular and is illustrated to extend along a length L between first and second longitudinal sides 54 and 56 and laterally extending along a width between the first and second lateral sides 50 and 52. In the application illustrated, the airbag 16A is sized to protect passengers of a vehicle including 3 rows of seats. The length L and width W may be readily adapted, however, for various other applications.

The airbag 16A may have a one-piece woven (OPW) construction including an upper layer (not particularly shown), a lower layer 60, and a joining edge 62. The airbag 16A further includes an inlet 64 for receiving inflation gases from an inflator 66. In the embodiment illustrated, the inlet 64 may be located at the first longitudinal side 54 of the airbag 16A. The inlet 64 is in fluid communication with a plenum 68. The plenum 68 directs inflation gases from the inlet 64 to a plurality of inflatable chambers defined within the airbag by chamber boundaries 70. The chamber boundaries 70 may be defined by seams or welds connecting the upper layer to the lower layer 60.

The plurality of chambers is shown to include a plurality of primary inflatable chambers 72 and a plurality of secondary inflatable chambers 74. As used herein, the term "primary" when used to describe the inflatable chambers shall mean that the inflatable chamber is inflated directly by inflation gases received from the plenum 68. The term "secondary" when used to describe the inflatable chambers shall mean that the inflatable chamber is inflated indirectly by inflation gases received by the plenum 68 through the primary inflatable chambers. Explaining further, the primary inflatable chambers 72, which are in direct communication with the plenum 68, are inflated or at least substantially inflated first (e.g., before the secondary inflatable chambers 74). The primary inflatable chambers 72 function to quickly drive the airbag 16 to horizontally deploy in the longitudinal direction. The secondary inflatable chambers 74, which are in indirect fluid communication with the plenum 68 through the plurality of primary inflatable chambers 72, are inflated after the primary inflatable chambers 72 or at least after the primary inflatable chambers 72 are substantially inflated. The secondary inflatable chambers 74 function to tension the airbag 16A in the lateral direction. The primary and secondary inflatable chambers 72 and 74 cooperate to provide a barrier between the occupants of the vehicle and the roof frame 12.

As illustrated, the airbag 16A is shown to include first and second primary inflatable chambers 72 adjacent the first and second lateral sides 50 and 52 of the airbag 16A, respectively. In the embodiment illustrated, the first and second primary inflatable chambers 72 extend along at least half of the length L of the airbag 16A and linearly extend from the plenum 68 to the second longitudinal side 56 of the airbag 16A. The primary inflatable chambers 72 may further include a third primary inflatable chamber 72 laterally disposed between and fluidly separated from the first and second primary inflatable chambers 72.

The secondary inflatable chambers 74 are laterally disposed between the first and second lateral sides 50 and 52 of the airbag 16A and are elongated in the longitudinal direction. In the embodiment illustrated, at least one, and preferably two secondary inflatable chambers 74 are laterally disposed between the first primary inflatable chamber 72 adjacent the first lateral side 50 and the third primary inflatable chamber 72. Similarly, at least one, and preferably two secondary inflatable chambers 74 are laterally disposed between the second primary inflatable chamber 72 adjacent the second lateral side 52 and the third primary inflatable chamber 72. The secondary inflatable chambers 74 each linearly extend from an open end proximate the second longitudinal side 56 of the airbag 16A to a closed end adjacent the plenum 68.

The airbag 16A may also include a further inflatable chamber 76 longitudinally disposed between the inlet 64 and the third primary inflatable chamber 72. The plenum 68 effectively wraps around the further inflatable chamber 76 for directly delivering inflation gases to each of the primary inflatable chambers 72. The plenum 68 also directly delivers inflation gases to the further inflatable chamber 76 through an opening 78 adjacent the third primary inflatable chamber 72.

Figure 7:
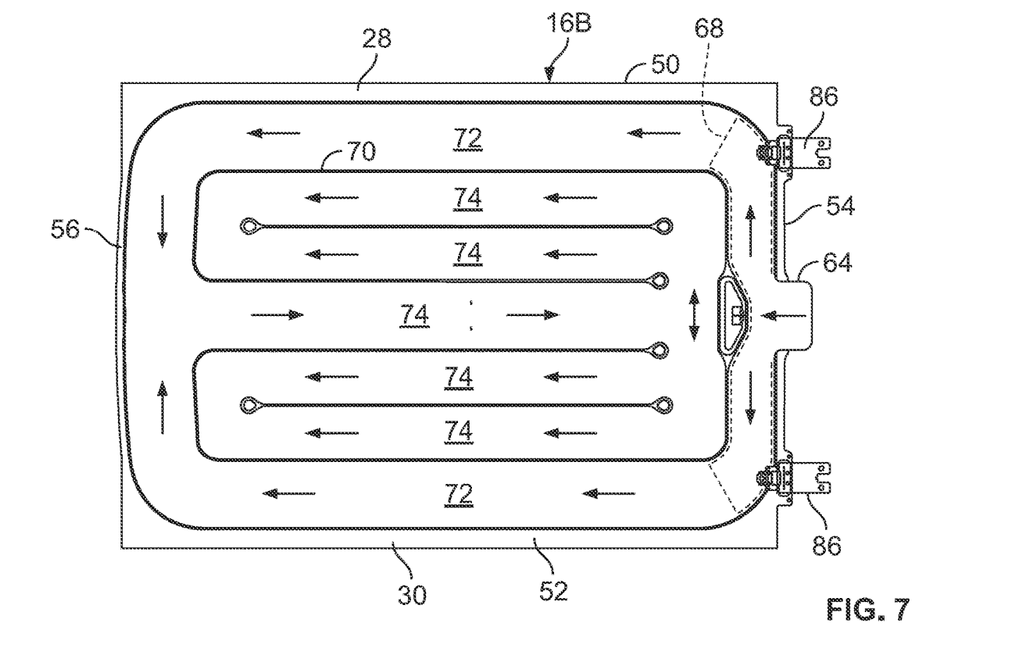
FIG. 7 is a view similar to FIG. 6 illustrating another airbag in accordance with the present teachings.

Turning to FIG. 7, another particular embodiment of a roof airbag in accordance with the present teachings is illustrated and generally identified at reference character 16B. As with the roof airbag 16A, the roof airbag 16B includes first and second primary inflatable chambers 72 adjacent the first and second lateral sides 50 and 52 of the airbag 16A, respectively. In the embodiment illustrated, the first and second primary inflatable chambers 72 extend substantially along the length L of the airbag 16B and linearly extend from the plenum 68 to the second longitudinal side 56 of the airbag 16A. The plenum 68 is in fluid communication with the first and second primary inflatable chambers 72 at the first longitudinal side 54 of the airbag 16B.

The roof airbag 16B also includes a plurality of secondary inflatable chambers 74. As illustrated, the secondary inflatable chambers include a laterally centered secondary inflatable chamber 74 in fluid communication with the primary inflatable chambers 72 at the second longitudinal side 56 of the roof airbag 16B. The secondary inflatable chambers 74 further include first and second U-shaped secondary inflatable chambers 74 that receive inflation gases from the laterally centered secondary inflatable chamber 74. The first U-shaped secondary inflatable chambers 74 are laterally disposed between the laterally centered secondary inflatable chamber 74 and the first primary inflatable chamber 72. The second U-shaped secondary inflatable chambers 74 are laterally disposed between the laterally centered secondary inflatable chamber 74 and the second primary inflatable chamber 72.

Figure 8:
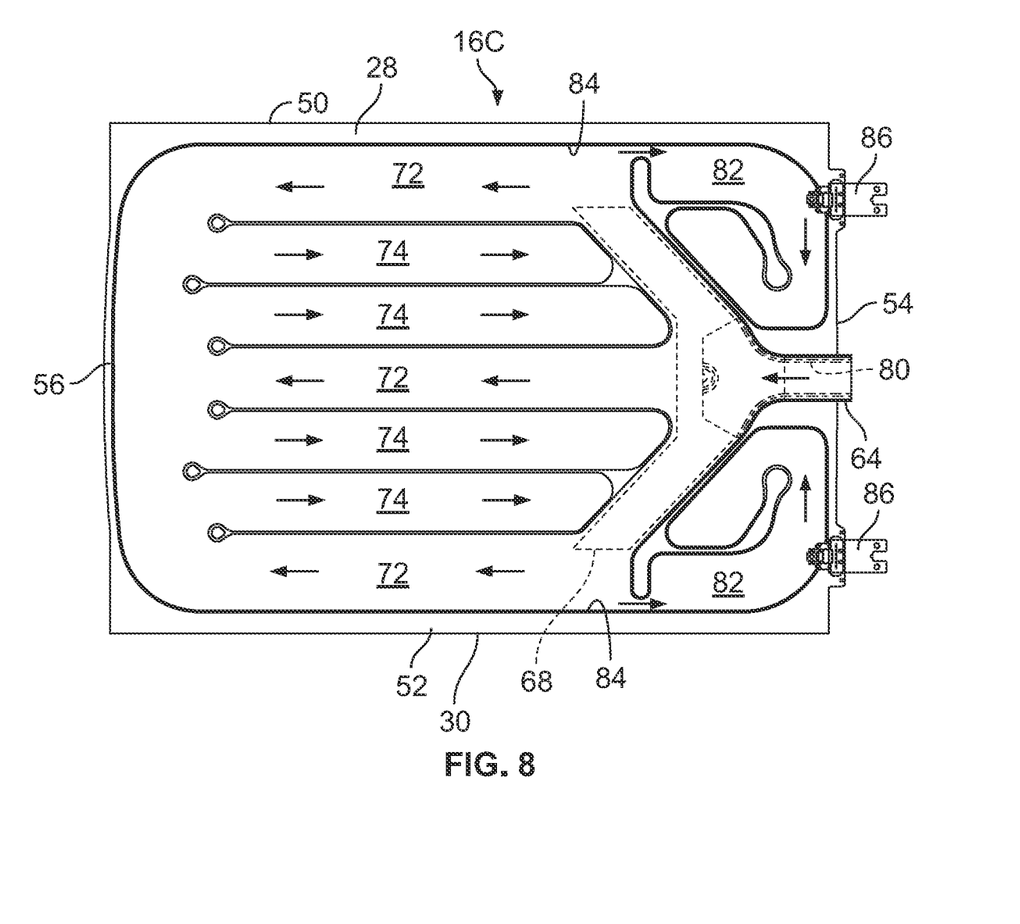
FIG. 8 is another view similar to FIG. 6 illustrating another airbag in accordance with the present teachings.

Turning to FIG. 8, another particular embodiment of a roof airbag in accordance with the present teachings is illustrated and generally identified at reference character 16C. Similar to the earlier introduced embodiments, the roof airbag 16C includes a plurality of primary inflatable chambers 72 and a plurality of secondary inflatable chambers 74. The roof airbag 16C is further shown to include a protective sleeve or liner 80 lining an interior of the inlet 64 first and a portion of the plenum 68. The protective liner 80 protects the material of the roof airbag 16C from the heat and pressure of the inflation gases. The roof airbag 16C is further shown to include first and second further inflatable chambers 82.

The plenum 68 includes first and second arms that deliver inflation gases to first and second primary inflatable chambers that are located adjacent the first and second lateral sides 50 and 52 of the roof airbag 16C. The plenum 68 is also in direct fluid communication with a laterally central primary inflatable chamber 72. As illustrated, the arms of the plenum are skewed relative to both the first and second longitudinal sides 54 and 56 and the first and second lateral sides 50 and 52. The secondary inflatable chambers 74 are shown to include at least one, and preferably at least two secondary chambers 74 laterally located between the first primary inflatable chamber 72 and the laterally centered primary inflatable chamber 72. The secondary inflatable chambers 74 are shown to further include at least one, and preferably at least two secondary chambers 74 laterally located between the second primary inflatable chamber 72 and the laterally centered primary inflatable chamber 72.

The first and second further inflatable chambers 82 are C-shaped and laterally disposed between the inlet 64 and the first and second lateral sides 50 and 52 of the roof airbag 16C. The first further inflatable chamber 82 is in fluid communication with the first primary inflatable chamber 72 through a reduced area opening 84. The second further inflatable chamber 82 is similarly in fluid communication with the second primary inflatable chamber 72 through a reduced area opening 84.

Figure 9:
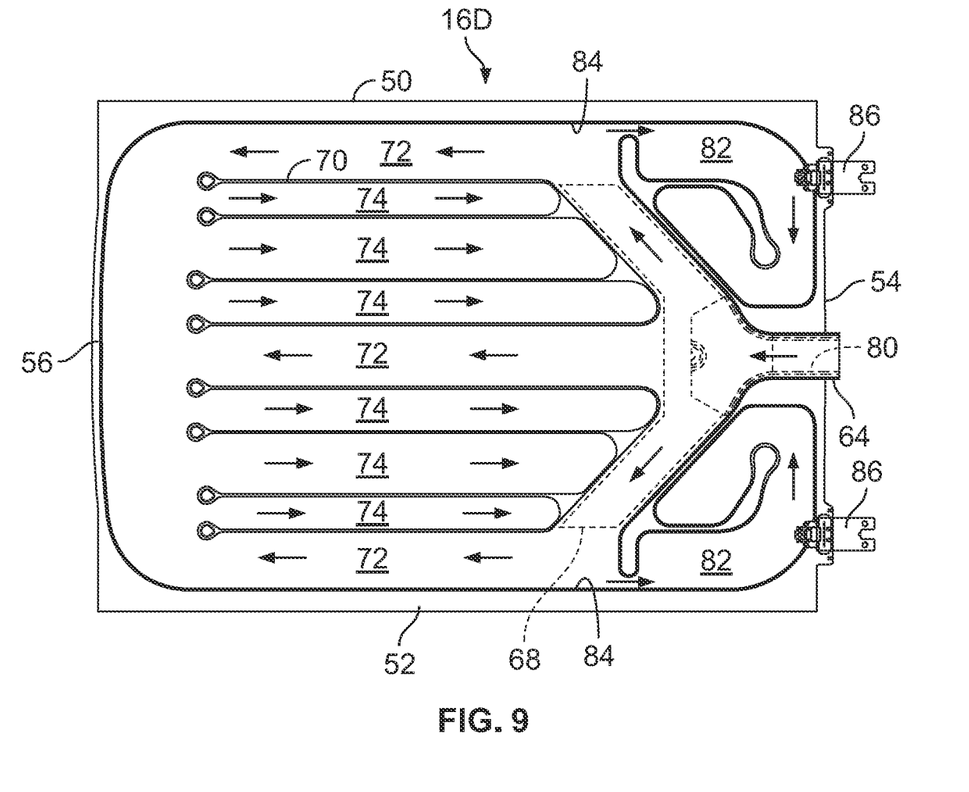
FIG. 9 is another view similar to FIG. 6 illustrating another airbag in accordance with the present teachings.

Turning to FIG. 9, another particular embodiment of a roof airbag in accordance with the present teachings is illustrated and generally identified at reference character 16D. The roof airbag 16D differs from the roof airbag 16C by including three secondary chambers 74 laterally located between the first primary inflatable chamber 72 and the laterally centered primary inflatable chamber 72 and three secondary chambers 74 laterally located between the second primary inflatable chamber 72 and the laterally centered primary inflatable chamber 72.

Figure 10:
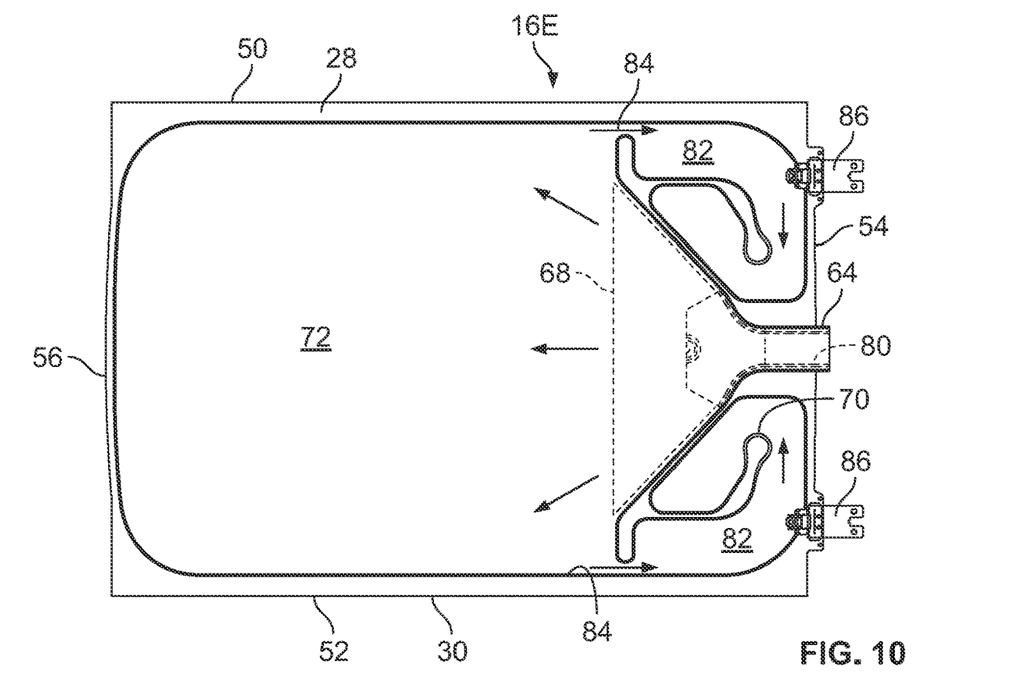
FIG. 10 is another view similar to FIG. 6 illustrating another airbag in accordance with the present teachings.

Turning to FIG. 10, another particular embodiment of a roof airbag in accordance with the present teachings is illustrated and generally identified at reference character 16E. The roof airbag 16E differs from the roof airbags 16C and 16D in that the roof airbag 16E includes only a single primary inflatable chamber 72 and does not include any secondary inflatable chambers 74. The plenum 68 delivers inflation gases directly to the primary inflatable chamber 72.

Figure 11:
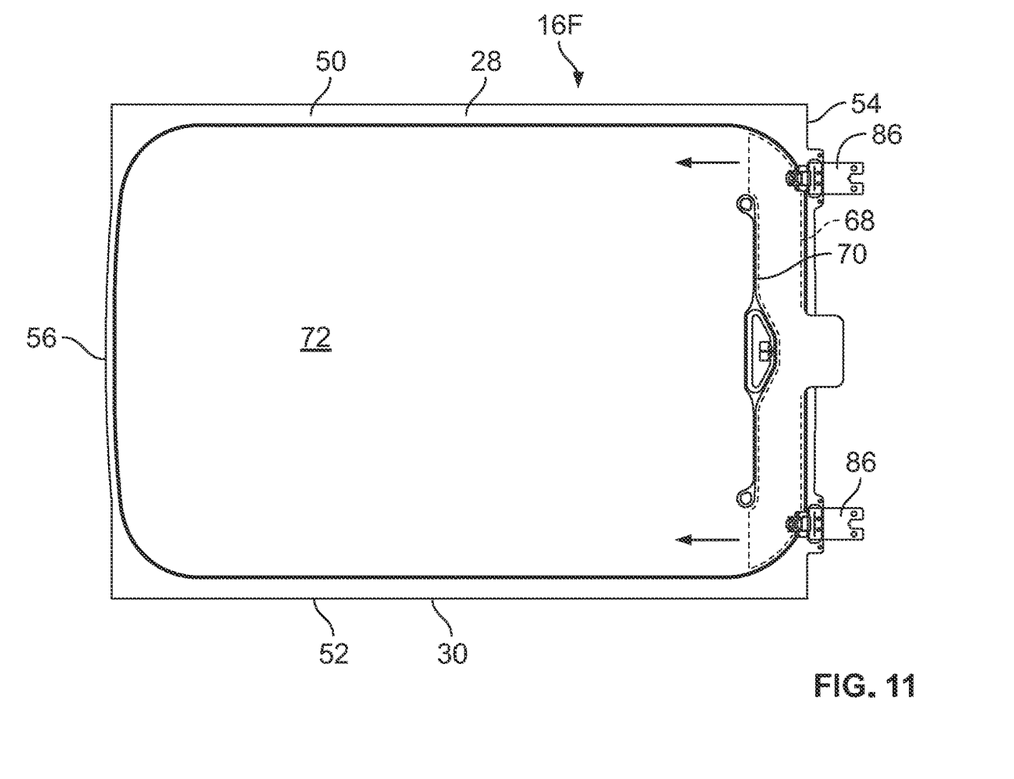
FIG. 11 is another view similar to FIG. 6 illustrating another airbag in accordance with the present teachings.

Turning to FIG. 11, another particular embodiment of a roof airbag in accordance with the present teachings is illustrated and generally identified at reference character 16F. The roof airbag 16F is similar to the roof airbag 16E in that the roof airbag 16F includes a single primary inflatable chamber 72 and does not include any secondary inflatable chambers 74. The plenum 68 laterally extends across the roof airbag 16F adjacent the first longitudinal side. The plenum 68 is in fluid communication with the primary inflatable chamber adjacent the first and second lateral sides 50 and 52 of the roof airbag 16F.

Figure 13:
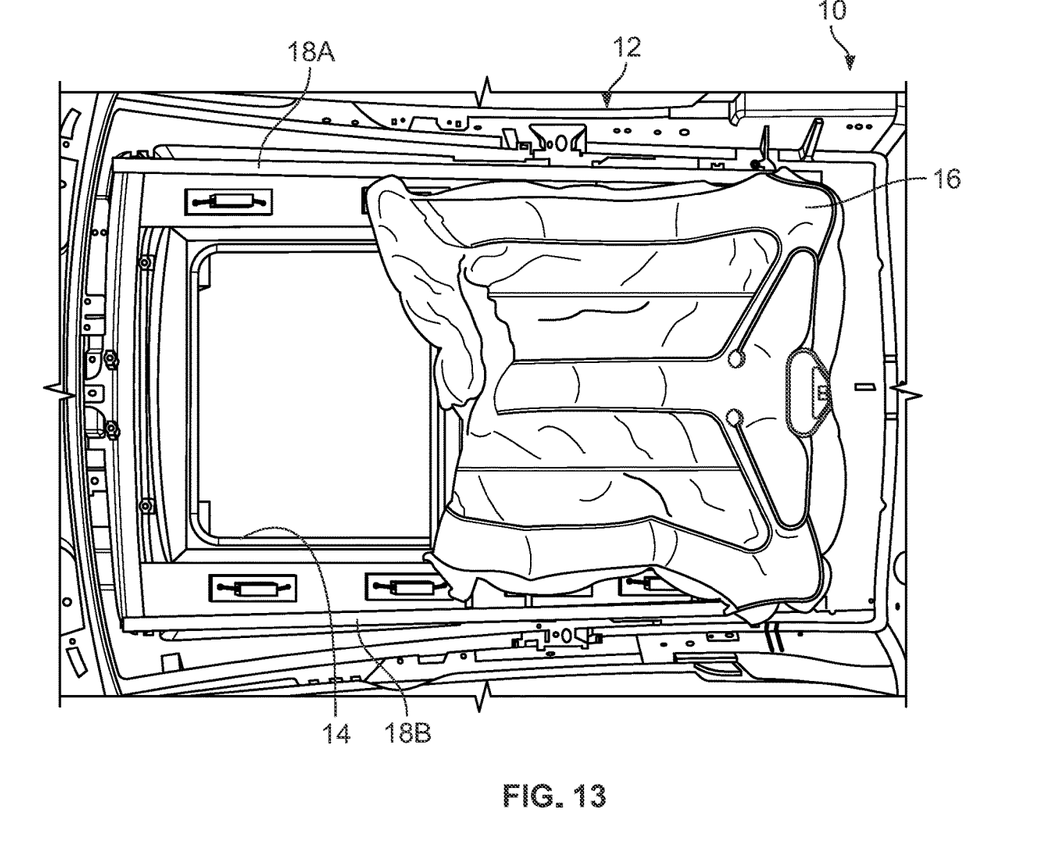
FIG. 13 is another view similar to FIG. 6, illustrating the airbag as the airbag is deployed from the stowed position to the deployed position.

With particular reference to FIGS. 1 and 12-13, a method of deploying a roof airbag 16 of the present teachings will be described. The roof airbag 16 is normally in a stowed position. As shown particularly in FIG. 12, in the stowed position, the roof airbag 16 is laterally forward of the panoramic opening 14 (i.e., in a vehicle direction). Alternatively, the roof airbag 16 may be stowed in a position laterally behind the panoramic opening 14. In applications where the roof airbag 16 is adapted to deploy in a lateral direction, the stowed airbag 16 may be laterally offset from the panoramic opening 14. It will be understood that the roof airbag 16 may be located between the roof frame 12 and a headliner (not shown). The roof airbag 16 may be attached to the roof frame 12 with conventional mounting tabs 86. In this manner, the first longitudinal side 54 of the airbag 16 is fixed relative to the roof frame 12.

Deployment of the roof airbag 16 occurs in response to activation of the inflator 66. The inflator 66 activates in response to a sensed condition indicating a predetermined vehicle collision or event. The inflator 66, its activation, and the sensing of the vehicle collision or event will be understood to be conventional insofar as the present teachings are concerned.

The inflator 66 delivers inflation gases to the plenum 68. The plenum directly delivers inflation gases to the primary inflatable chambers 72. The primary inflatable chambers 72 function to quickly drive the airbag 16 to horizontally deploy in the longitudinal direction. The secondary inflatable chambers 74 receive inflation gases from the plurality of primary inflatable chambers 72 and are inflated after the primary inflatable chambers 72 or at least after the primary inflatable chambers 72 are substantially inflated. The secondary inflatable chambers 74 tension the airbag 16 in the lateral direction. The primary and secondary inflatable chambers 72 and 74 cooperate to provide a barrier between the occupants of the vehicle and the roof frame 12 to thereby protect the occupants.

While specific embodiments and applications of the present disclosure have been illustrated and described, it is to be understood that the invention is not limited to the precise configuration and components disclosed herein. Various modifications, changes, and variations, which will be apparent to those skilled in the art, may be made in the arrangement, operation, and details of the methods and systems of the present disclosure without departing from the spirit and scope of the disclosure.

What is claimed is:

1. A roof airbag for a vehicle, the roof airbag comprising:
an airbag longitudinally extending along a length between first and second longitudinal ends and laterally extending along a width between first and second lateral sides;
an inlet for receiving inflation gases at the first longitudinal end;
a plenum in fluid communication with the inlet for receiving the inflation gases from the inlet;
a plurality of primary inflatable chambers including first, second and third primary inflatable chambers each in direct fluid communication with the plenum to receive inflation gases from the plenum and direct the inflation gases to the second longitudinal end; and
a plurality of secondary inflatable chambers in indirect fluid communication with the plenum to receive inflation gases indirectly from the plenum through the plurality of primary inflatable chambers,
wherein the primary inflatable chambers of the plurality of primary inflatable chambers are arranged to first drive deployment of the airbag and subsequently inflate the second inflatable chambers of the plurality of second inflatable chambers to tension the airbag in a lateral direction, and the primary and secondary inflatable chambers cooperate to provide a barrier between occupants of the vehicle and a roof frame.

2. The roof airbag of claim 1, wherein the first and second primary inflatable chambers are adjacent the first and second lateral sides of the airbag, respectively.

3. The roof airbag of claim 2, wherein the third primary inflatable chamber is laterally disposed between and fluidly separated from the first and second primary inflatable chambers.

4. The roof airbag of claim 3, further comprising a further inflatable chamber longitudinally disposed between the inlet and the third primary inflatable chamber.

5. The roof airbag of claim 4, wherein the further inflatable chamber includes an opening adjacent the third primary inflatable chamber for receiving inflation gases.

6. The roof airbag of claim 5, wherein the plenum completely extends around the further inflatable chamber.

7. The roof airbag of claim 6, wherein the plenum includes first and second arms for delivering inflation gases to the first and second primary inflatable chambers, respectively.

8. The roof airbag of claim 3, wherein the plurality of secondary inflatable chambers includes a first secondary inflatable chamber and a second secondary inflatable chamber laterally between the first primary inflatable chamber and the third primary inflatable chamber, and the plurality of secondary inflatable chambers further includes a third secondary inflatable chamber and a fourth secondary inflatable chamber laterally between the second primary inflatable chamber and the third primary inflatable chamber.

9. The roof airbag of claim 2, wherein the secondary inflatable chambers are laterally disposed between the first and second lateral sides of the airbag.

10. The roof airbag of claim 9, wherein the secondary inflatable chambers are in fluid communication with the primary inflatable chambers at the second longitudinal end of the airbag.

11. The roof airbag of claim 9, wherein the secondary inflatable chambers each linearly extend from an open end proximate the second longitudinal end of the airbag to a closed end adjacent the plenum.

12. The roof airbag of claim 2, further comprising first and second further inflatable chambers, the first further inflatable chamber located adjacent the first lateral side and longitudinally between the first primary inflatable chamber and the first longitudinal end, the second further inflatable chamber located adjacent the second lateral side and longitudinally between the second primary inflatable chamber and the first longitudinal end.

13. The roof airbag of claim 12, wherein the first and second further inflatable chambers are C-shaped.

14. The roof airbag of claim 1, wherein the first and second primary inflatable chambers extend along at least half of the length of the airbag.

15. The roof airbag of claim 14, wherein the first and second primary inflatable chambers both linearly extend from the plenum to the second longitudinal end of the airbag.

16. The roof airbag of claim 1, further comprising a liner including a first portion disposed in the inlet and a second portion disposed in the plenum.

17. A method of inflating the roof airbag of claim 1, the method comprising:
directing inflation gases directly from the plenum to the primary inflatable chambers; and
directing inflation gases from the primary inflatable chambers to the secondary inflatable chambers.

18. A roof airbag for a vehicle, the roof airbag comprising:
an airbag longitudinally extending along a length between first and second longitudinal ends and laterally extending along a width between first and second lateral sides;
an inlet for receiving inflation gases at the first longitudinal end;
a plenum in fluid communication with the inlet for receiving the inflation gases from the inlet;
a plurality of primary inflatable chambers including first, second and third primary inflatable chambers each in direct fluid communication with the plenum to receive inflation gases from the plenum and direct the inflation gases to the second longitudinal end;
a plurality of secondary inflatable chambers in indirect fluid communication with the plenum to receive inflation gases indirectly from the plenum through the plurality of primary inflatable chambers; and
a further inflatable chamber longitudinally disposed between the inlet and the third primary inflatable chamber,
wherein the primary inflatable chambers of the plurality of primary inflatable chambers are arranged to first drive deployment of the airbag and subsequently inflate the second inflatable chambers of the plurality of second inflatable chambers to tension the airbag in a lateral direction, and the primary and secondary inflatable chambers cooperate to provide a barrier between occupants of the vehicle and a roof frame.

19. The roof airbag of claim 18, wherein the further inflatable chamber includes an opening adjacent the third primary inflatable chamber for receiving inflation gases and further wherein the plenum completely extends around the further inflatable chamber.

* * * * *